United States Patent
Hasegawa

(10) Patent No.: US 8,035,941 B2
(45) Date of Patent: Oct. 11, 2011

(54) DC/AC INVERTER SUBSTRATE HAVING VOLTAGE ABNORMALITY DETECTOR CIRCUIT

(75) Inventor: Yuuichi Hasegawa, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 350 days.

(21) Appl. No.: 12/201,746

(22) Filed: Aug. 29, 2008

(65) Prior Publication Data

US 2009/0185105 A1  Jul. 23, 2009

(30) Foreign Application Priority Data

Sep. 4, 2007  (JP) .................................. 2007-228752

(51) Int. Cl.
*H02H 3/20* (2006.01)

(52) U.S. Cl. ........................... 361/91.1; 361/35; 324/239

(58) Field of Classification Search .................. 361/91.1, 361/35; 324/239, 244, 249, 251, 252, 254
See application file for complete search history.

(56) References Cited

U.S. PATENT DOCUMENTS

| 7,394,671 | B2 * | 7/2008 | Fukumoto et al. ............... 363/24 |
| 7,733,078 | B2 * | 6/2010 | Duke ............................ 324/72.5 |
| 2005/0030776 | A1 * | 2/2005 | Lin ................................. 363/98 |
| 2005/0075808 | A1 * | 4/2005 | Jensen et al. ..................... 702/64 |
| 2008/0054882 | A1 * | 3/2008 | Duke ............................. 324/133 |
| 2009/0237969 | A1 * | 9/2009 | Fukumoto et al. ............... 363/97 |

FOREIGN PATENT DOCUMENTS

| JP | 9264792 | A | 10/1997 |
| JP | 200083319 | A | 3/2000 |
| JP | 200114093 | A | 1/2001 |
| JP | 2001286161 | A | 10/2001 |
| JP | 200222777 | A | 1/2002 |
| JP | 200328823 | A | 1/2003 |
| JP | 2005183099 | A | 7/2005 |
| JP | 2006105955 | A | 4/2006 |

* cited by examiner

*Primary Examiner* — Patrick Salce
(74) *Attorney, Agent, or Firm* — Sughrue Mion, PLLC

(57) ABSTRACT

A DC/AC inverter substrate includes a voltage abnormality detector circuit. All of a high voltage side detection sensor, a low voltage side detection sensor, and a high-voltage and low-voltage detection sensor in the voltage abnormality detector circuit are disposed without being electrically connected to a secondary side of a transformer or to a connection point. Those detection sensors are not damaged since overvoltage is not applied to the voltage abnormality detector circuit when abnormal discharge occurs because the detection sensors are not electrically connected.

6 Claims, 5 Drawing Sheets

DC/AC INVERTER SUBSTRATE HAVING VOLTAGE ABNORMALITY DETECTOR CIRCUIT

This application is based upon and claims the benefit of priority from Japanese Patent Application No. 2007-228752 filed on Sep. 4, 2007, the disclosure of which is incorporated herein in its entirety by reference.

BACKGROUND OF THE INVENTION

1. Field of the Invention

The present invention relates to a DC/AC inverter substrate for controlling the lighting of a liquid crystal backlight, and more particularly, to a DC/AC inverter substrate having a voltage abnormality detector circuit which is capable of detecting a voltage abnormality.

2. Description of the Related Art

A liquid crystal display device requires backlight as a light source because the device is non-luminous. As the light source of the backlight, there is used a cold cathode fluorescent lamp (CCFL) or a light emitting diode (LED). In order to light those light sources, the liquid crystal display device has a DC/AC inverter substrate on which a lighting circuit is mounted. The DC/AC inverter substrate includes a DC/AC inverter circuit that generates a high AC voltage from a DC voltage and a lighting circuit as well as a protection circuit. The protection circuit detects a current that flows in the light source, and stops the output of a high AC voltage when a current that flows in the light source becomes abnormally high.

The DC/AC inverter substrate (hereinafter also abbreviated as "INV substrate") is shown in FIG. 1. FIG. 1 shows a configuration example including four transformers each of which operates a lamp. The DC/AC inverter substrate is equipped with an input connector 11 that receives a DC voltage, output connectors 12 that output an AC voltage, transformers 13 that conduct DC/AC conversion, an overcurrent fuse 14 that protects the circuits against overcurrent, temperature fuses 15 that protect against overheat at the time of the abnormal output of the transformer, and tube current detector circuits 16 that feed back currents (hereinafter referred to as "tube current") from lamps which are connected to the output connectors 12, and stop the output when the tube current becomes equal to or higher than a given value.

For example, in the case where the output connectors 12 are opened due to the disconnection of the connectors, the tube current detector circuits 16 detect the current, and stop an inverter output circuit as abnormality. Also, when overheat occurs due to the abnormal output of the transformer, the temperature fuse 15 is burned out to stop the inverter output. When the DC input is overcurrent, the overcurrent fuse 14 is burned out to stop the inverter output. In this way, the overcurrent and the overheat of the INV substrate are detected to stop the inverter output, thereby preventing the INV substrate and the liquid crystal display device from being damaged.

For example, JP 2005-183099 A (hereinafter referred to as "Patent Document 1") discloses an electric discharge lamp lighting circuit having a protection circuit. In the case where electric discharge occurs in the secondary wiring of a high voltage transformer of the electric discharge lamp lighting circuit, the operation of the electric discharge lamp lighting circuit stops upon detection of the electric discharge. Patent Document 1 also proposes an inexpensive electric discharge lighting circuit which is configurable for a large-sized liquid crystal display device.

An electric discharge lamp lighting circuit 51 disclosed in Patent Document 1 is shown in FIG. 2. The electric discharge lamp lighting circuit 51 includes a control circuit 53 that is connected to an input voltage line 52, and a transformer driver circuit 54 that drives a transformer 55. Also, one terminal of an electric discharge lamp 56 is connected to one terminal of a secondary side of the transformer 55, and another terminal of the electric discharge lamp 56 is connected to a current voltage converter circuit 57 for converting a lamp current into a voltage, and a lamp current control pattern 58. An electric discharge detection pattern 61 is disposed in parallel to and in proximity to the lamp current control pattern 58 at a GND side of the secondary side of the transformer 55. An overcurrent detection resistor 59 is connected between the GND side of the secondary side of the transformer 55 and the electric discharge detection pattern 61. Both ends of the resistor 59 are connected to the respective anodes of diodes 60 and 62, and the respective cathodes of the diodes 60 and 62 are connected to each other, and also connected to the control circuit 53 through an integrator circuit 63. The integrator circuit 63 can be made up of a resistor 64 and a capacitor 65.

With the above configuration, corona discharge or arc discharge can be detected by a voltage that is induced in the electric discharge detection pattern 61 due to the high frequency components and the noise components of the lamp current that flows in the lamp current control pattern 58. When the induced voltage is detected, the operation of the electric discharge lamp lighting circuit stops to protect the electric discharge lamp lighting circuit. Because the electric discharge detection pattern is disposed at the GND side of the secondary side of the transformer, it is unnecessary to provide an independent electric discharge detection pattern, thereby making it possible to simplify the electric discharge lamp lighting circuit. Also, the electric discharge detection pattern is formed not linearly but zigzag, thereby enabling the provision of the inductance of an arbitrary pattern. As a result, the electric discharge can be more efficiently detected.

Further, JP 2000-83319A (hereinafter referred to as "Patent Document 2") discloses the protection circuit of a power supply device, and a detecting device in the conventional art. Patent Document 2 discloses the power supply device having heating prevention protecting means which is made up of a temperature sensor. JP 2001-14093 A discloses a contact detecting device using a planar interconnection and a connector for an electric connection. JP 2001-286161 A discloses a power supply device that monitors the output of a piezoelectric transformer.

JP 2002-22777 A discloses an optical system sensor device that measures the electric quantity of transmission and distribution electric wires such as a distribution electric wire or a transmission electric wire by the aid of the property that a current and a voltage act on light. Optical sensor heads are fixed to the respective transmission and distribution electric wires, read a change in the voltage or current of the transmission and distribution electric wires, and transmit the read change as electric signals.

JP 2003-28823 A discloses a signal processing device that alternately applies a higher voltage and a lower voltage to two sensors that are indicative of high sensitivity to a specific gas according to an applied voltage. JP 2006-105955 A discloses an energization detecting device in which a pair of sensors are arranged in proximity to the outside of a power supply cable, and detects the presence or absence of the energization according to a voltage between both of the electrodes. JP 09-264792 A discloses a noncontact temperature sensor that corrects a temperature difference between a front surface side and a rear surface side of the substrate by detecting the front surface and the rear surface thereof.

As described above, the liquid crystal display device includes the INV substrate on which the DC/AC inverter circuit having the high voltage transformer is mounted in order to light the backlight. In the INV substrate, there is a risk that a failure of connection between the secondary side terminal of the high voltage transformer and the wiring, a disconnection of the wiring, or a failure of connection with the lamp occurs. When an interval of the failure portions is narrow, there arises such a problem that the corona discharge or the arc discharge is generated in the failure portion to damage the INV substrate or the liquid crystal display device. Under the circumstances, the protection circuit is disposed on the INV substrate.

However, for example, the protection circuit disclosed in Patent Document 1 is insufficient, and suffers from the following problems. In Patent Document 1, in order to detect the corona discharge and the arc discharge, the electric discharge detection pattern and the lamp current control pattern are disposed in parallel to and in proximity to each other. The electric discharge detection pattern is disposed at the secondary side output of the transformer, and the lamp current control pattern is disposed in parallel to and in proximity to the electric discharge detection pattern of the output of the electric discharge lamp.

As a first drawback, the corona discharge or the arc discharge in the secondary side wiring of the transformer can be detected by the electric discharge detection pattern and the lamp current control pattern. However, there is no disclosure of the technique for detecting the corona discharge or the arc discharge at the low voltage side of the lamp, and the electric discharge at the low voltage side of the lamp cannot be detected. Also, there is no specific disclosure of the details of the pattern, for example, the pattern layout position relative to the transformer or the lamp connection point, or the pattern sizes. For that reason, when the respective patterns are positioned apart from a portion where the corona discharge or the arc discharge is generated, the abnormal voltage of electric discharge attenuates down to approximately the same voltage level as the normal voltage, and cannot be detected.

As a second drawback, there is the necessity that a position at which the electric discharge detection pattern and the lamp current control pattern are arranged on a printed circuit board is restricted. For example, there is a case in which the respective patterns cannot be disposed in parallel to or in proximity to each other depending on the arrangement of parts that are mounted on the printed circuit board. On the contrary, when an attempt is made to dispose the respective patterns in parallel to or in proximity to each other, the sizes of the printed circuit board need to be given larger sizes taking the mounted parts into consideration, thereby making it difficult to reduce the sizes of the printed circuit board. In other words, this system is disadvantageous in downsizing the printed circuit board.

As a third drawback, the abnormal voltage gets into the electric discharge detection pattern, and damages the pattern. As a result, the abnormal voltage cannot be detected. The electric discharge detection pattern is electrically connected directly to the secondary side output of the transformer. For that reason, when the corona discharge or the arc discharge occurs, the abnormal voltage gets into the electric discharge detection pattern. As a result, the electric discharge detection pattern is damaged, and the abnormal voltage cannot be detected. Similarly, because the lamp current control pattern is also electrically connected to the output of the electric discharge lamp, when the corona discharge or the arc discharge occurs, the abnormal voltage gets into the electric discharge detection pattern. For that reason, the pattern is damaged, and the abnormal voltage cannot be detected.

As described above, in the protection circuit disclosed in the prior art document, it is insufficient to detect the abnormal voltage which is attributable to the abnormal discharge, and a more effective protection circuit is expected. In view of the above circumstances, an object of the present invention is to provide a DC/AC inverter substrate having a voltage abnormality detector circuit which is capable of particularly detecting the voltage abnormality which is attributable to the abnormal discharge.

SUMMARY OF THE INVENTION

A DC/AC inverter substrate according to the present invention has a voltage abnormality detector circuit. In one embodiment, a voltage abnormality detector circuit includes: a transformer; a connection point for connecting to a lamp; a high voltage side detection sensor that is disposed at a secondary side of the transformer without being electrically connected to the secondary side; a high-voltage voltage abnormality detector circuit that receives a sense voltage from the high voltage side detection sensor and outputs an abnormality detection signal when the sense voltage is equal to or higher than a set value; and a control circuit that receives the abnormality detection signal from the high-voltage voltage abnormality detector circuit and stops transformer output.

In another embodiment, a voltage abnormality detector circuit includes: a transformer; a connection point for connecting to a lamp; a low voltage side detection sensor that is disposed at the connection point without being electrically connected to the connection point; a low-voltage voltage abnormality detector circuit that receives a sense voltage from the low voltage side detection sensor and outputs an abnormality detection signal when the sense voltage is equal to or higher than a set value; and a control circuit that receives the abnormality detection signal from the low-voltage voltage abnormality detector circuit and stops transformer output.

In another embodiment, a voltage abnormality detector circuit includes: a transformer; a connection point for connecting to a lamp; a high voltage side detection sensor that is disposed at a secondary side of the transformer without being electrically connected to the secondary side; a high-voltage voltage abnormality detector circuit that receives a sense voltage from the high voltage side detection sensor and outputs an abnormality detection signal when the sense voltage is equal to or higher than a set value; a low voltage side detection sensor that is disposed at the connection point without being electrically connected to the connection point; a low-voltage voltage abnormality detector circuit that receives a sense voltage from the low voltage side detection sensor and outputs an abnormality detection signal when the sense voltage is equal to or higher than the set value; and a control circuit that receives the abnormality detection signal from the high-voltage voltage abnormality detector circuit and the abnormality detection signal from the low-voltage voltage abnormality detector circuit, and stops transformer output in response to at least one of the two abnormality detection signals.

In another embodiment, a voltage abnormality detector circuit includes: a transformer; a connection point for connecting to a lamp; a high-voltage and low-voltage detection sensor that is disposed between a secondary side of the transformer and the connection point; a high-voltage and low-voltage voltage abnormality detector circuit that receives a sense voltage from the high-voltage and low-voltage detection sensor and outputs an abnormality detection signal when the sense voltage is equal to or higher than a set value; and a control circuit that receives the abnormality detection signal from the high-voltage and low-voltage voltage abnormality detector circuit and stops the transformer output.

In another embodiment, a light source unit includes the above DC/AC inverter substrate having a voltage abnormality detector circuit in which the lamp is connected to the connection point. Further a liquid crystal display device includes a liquid crystal panel, an electric circuit that drives the liquid crystal panel, and the above light source unit.

The DC/AC inverter substrate according to the present invention includes a voltage abnormality detector circuit. All of a high voltage side detection sensor, a low voltage side detection sensor, and a high-voltage and low-voltage detection sensor of the voltage abnormality detector circuit are disposed without being electrically connected to the secondary side of the transformer or to the connection point. Because those detection sensors are not electrically connected, the overvoltage is not applied to the voltage abnormality detector circuit when the abnormal discharge occurs. For that reason, there can be obtained such an advantage that the voltage abnormality detector circuit is not damaged.

According to the configuration of the present invention, there can be obtained the DC/AC inverter substrate having the voltage abnormality detector circuit which is capable of stably detecting the abnormal voltage when the abnormal discharge occurs.

DETAILED DESCRIPTION OF PREFERRED EMBODIMENTS

Hereinafter, a description will be given in more detail of a DC/AC inverter substrate according to the present invention with reference to the accompanying drawings.

First Exemplary Embodiment

A first exemplary embodiment of the present invention will be described with reference to FIGS. 3 to 5 and Tables 1 to 4.

Figure 1:
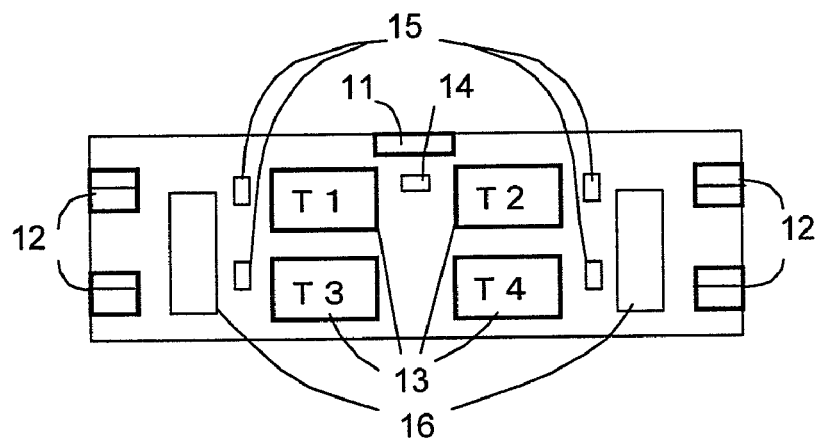
FIG. 1 is an external view showing a DC/AC inverter substrate.
Figure 2:
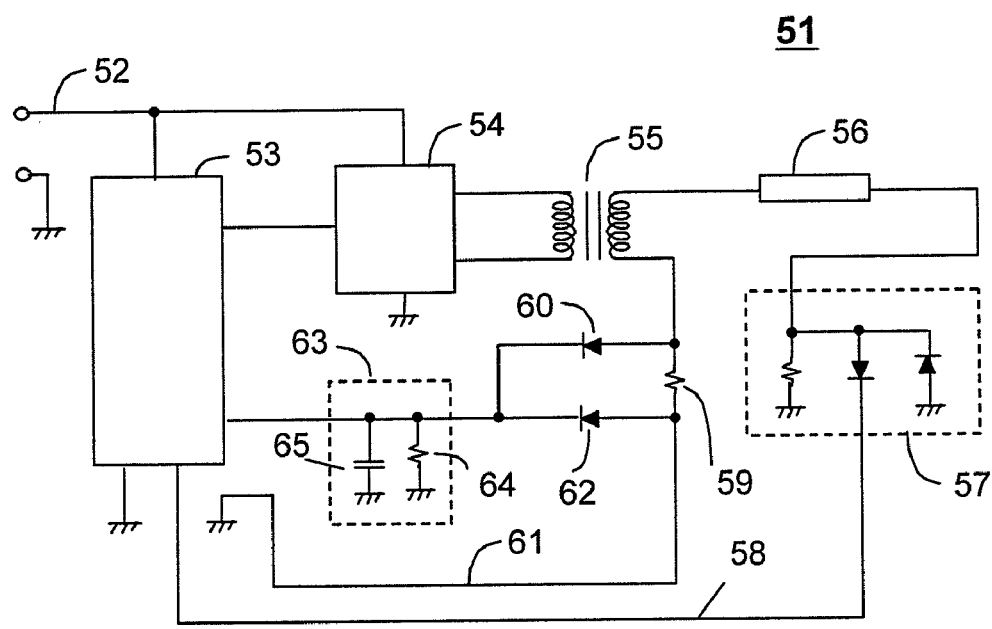
FIG. 2 is a diagram showing an electric discharge lamp lighting circuit according to Patent Document 1.
Figure 3:
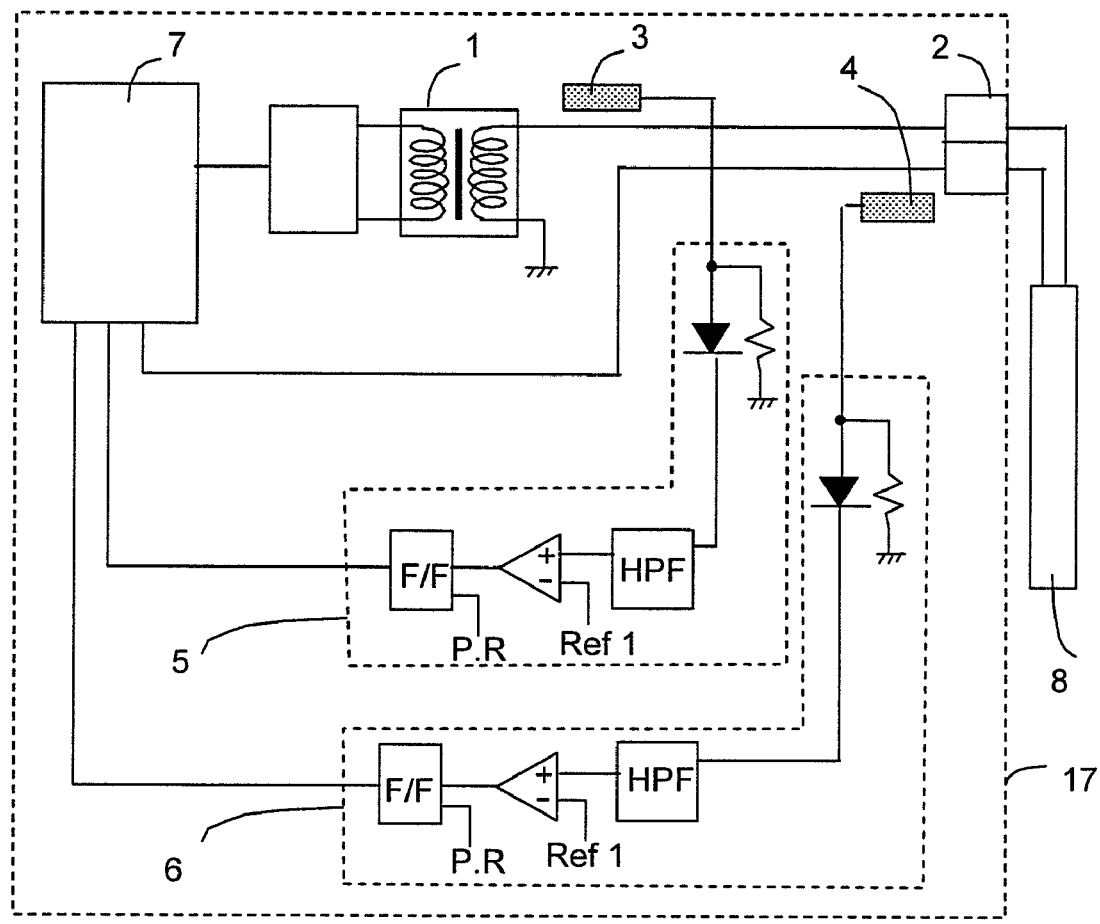
FIG. 3 is a diagram showing a voltage abnormality detector circuit according to a first exemplary embodiment of the present invention.

FIG. 3 shows a diagram of a voltage abnormality detector circuit that controls the lighting of a liquid crystal display device backlight. FIG. 4 shows an external view of a DC/AC inverter substrate. FIG. 5 shows an external view showing a layout position of high voltage side and low voltage side detection sensors. Tables 1 to 4 show the measurement results of the voltage abnormality detector circuit, respectively.

The voltage abnormality detector circuit 17 of this embodiment as shown in FIG. 3 includes a transformer 1 that converts the output from DC to AC, and a connection point 2 including two contacts at the high voltage side where a voltage is applied to a lamp 8 of the liquid crystal backlight and the low voltage side in which a lamp return current flows. The voltage abnormality detector circuit 17 also includes a high voltage side detection sensor 3 made of an electric conductor which is disposed in the vicinity of the secondary side (output) of the transformer 1, a low voltage side detection sensor 4 made of an electric conductor which is disposed in the vicinity of the lamp return current side of the connection point 2, and a high-voltage voltage abnormality detector circuit 5 that is connected to the output of the high voltage side detection sensor 3. The voltage abnormality detector circuit 17 further includes a low-voltage voltage abnormality detector circuit 6 that is connected to the output of the low voltage side detection sensor 4, and a control circuit 7 that receives two outputs of the high-voltage abnormality detector circuit 5 and the low-voltage voltage abnormality detector circuit 6, and the lamp return current from the connection point 2. In the two terminals of the connection point 2, one terminal side that applies a voltage from the secondary side of the transformer 1 to the lamp 8 is called "high voltage side", and another terminal side in which the lamp return current from the lamp 8 flows is called "low voltage side".

One output terminal of the transformer 1 is connected to the high voltage side of the connection point 2, and another output terminal thereof is connected to the ground voltage. One (high voltage side) of the connection point 2 is connected to the output from the transformer 1, and applies a voltage to the lamp 8. Another (low voltage side) of the connection point 2 is connected to the return side of the lamp 8, and also connected to the control circuit 7. The high voltage side detection sensor 3 is disposed in the vicinity of the secondary side (output) of the transformer 1, and outputs its sense voltage to the high-voltage voltage abnormality detector circuit 5. The low voltage side detection sensor 4 is disposed in the vicinity of the lamp return current side of the connection point 2, and outputs its sense voltage to the low-voltage voltage abnormality detector circuit 6. The control circuit 7 receives two outputs from the high-voltage abnormality detector circuit 5 and the low-voltage voltage abnormality detector circuit 6, and the lamp return current from the connection point 2.

Figure 4:
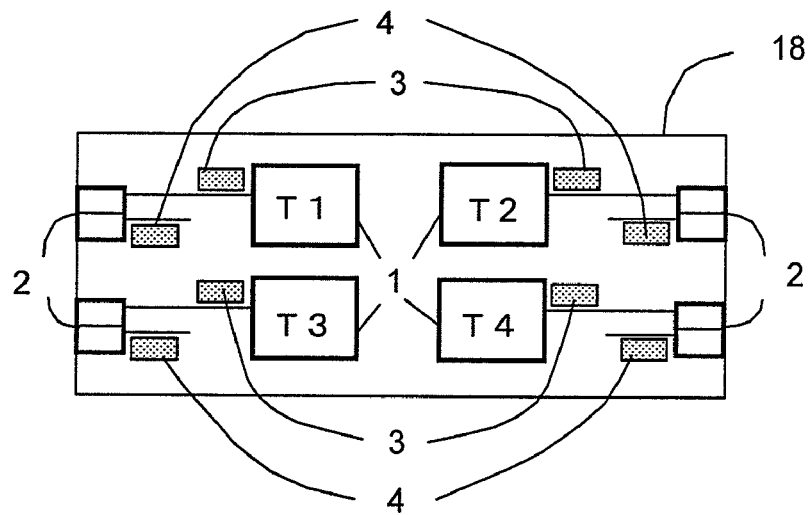
FIG. 4 is an external view showing a DC/AC inverter substrate according to the present invention.

On the INV substrate 18 shown in FIG. 4 are mounted the transformers 1, the connection points 2, the high voltage side detection sensors 3, the low voltage side detection sensors 4, the high-voltage voltage abnormality detector circuits 5, the low-voltage voltage abnormality detector circuits 6, and the control circuits 7. In this example, four pairs of those elements are mounted on the INV substrate 18. However, the number of pairs can be increased or decreased as the occasion demands. Also, the high-voltage voltage abnormality detector circuits 5, the low-voltage voltage abnormality detector circuits 6, and the control circuits 7 are omitted from the figure. The lamp 8 is connected to the two terminals (high voltage side, low voltage side) of the connection point 2, and is applied with the high voltage from the transformer 1 to light.

The high-voltage abnormality detector circuit 5 and the low-voltage voltage abnormality detector circuit 6 can be configured by the same circuit although being not particularly limited. For example, the sense voltages from the respective detection sensors are applied to one terminal of a resistor and the anode of a diode. Another terminal of the resistor is connected to the ground voltage. The sense voltage is input to a high pass filter (HPF) through the cathode of the diode. The output of the HPF and a threshold voltage Ref1 are compared with each other by a comparator, and a comparison result thereof is output to a flip-flop circuit as an abnormality detection signal. When the abnormality voltage is detected by the high-voltage and low-voltage voltage abnormality detector circuits, the control circuit 7 stops the output of the transformer 1 according to the abnormality detection signal that passes through the respective flip-flop circuits.

During the normal operation, an input voltage to the comparator from the detection sensor is about 4 V. However, when abnormal discharge such as arc discharge or corona discharge occurs from the transformer 1, the lamp 8, or a lamp cable, the input voltage to the comparator increases up to 5-8V. For example, in the case of abnormal discharge, the voltage that is input to the comparator is 6 V at the high voltage side and 5 V at the low voltage side. In this situation, a reference value (threshold voltage) of the comparator is set to 4 V or higher, for example, 4.5 V. When a high voltage occurs due to the abnormal discharge, the comparator determines the high voltage as abnormality, and outputs the abnormality detection signal to the control circuit 7 to stop the transformer output of the INV substrate.

In order to precisely determine the abnormal voltage, a threshold voltage Ref1 needs to be set to be larger than a voltage in a normal state by some degree, but the voltage value is not particularly restricted. In this embodiment, because the voltage variation in the normal state is about +0.2 to 0.3V, the threshold value is set to a value obtained by adding 0.5 V to the voltage (4 V) in the normal state. As a result, the abnormality can be detected without any trouble of erroneous determination. In this way, the voltage is detected by the high voltage side detection sensor 3 that is disposed in the vicinity of the secondary side of the transformer 1, and the low voltage side detection sensor 4 that is disposed in the vicinity of the connection point 2. The sense voltages from the respective detection sensors are compared by the high-voltage voltage abnormality detector circuits 5 and the low-voltage voltage abnormality detector circuits 6.

For example, the voltage abnormality such as the arc discharge or the corona discharge occurs due to the connection failure of the connection point 2 (including a semi-contact state), or the cable disconnection or the cable contact failure at the lamp 8 side. In this case, a voltage (5 to 8 V) that is larger than the normal voltage is generated, detected by the high voltage side and low voltage side detection sensors, and determined as the abnormal voltage by the high-voltage and low-voltage voltage abnormality detector circuits. In the high-voltage and low-voltage voltage abnormality detector circuits, an arbitrary voltage that is equal to or higher than about the normal voltage (4 V) is set as an upper threshold voltage (for example, 4.5 V). When the voltage that is larger than the upper threshold voltage is generated due to the voltage abnormality, the comparator determines the voltage as the abnormality, inputs the abnormality detection signal to the control circuit 7, and stops the output of the INV substrate.

Subsequently, a description will be given of the layout position and sizes of the high voltage side and low voltage side detection sensors on the basis of the measurement results. Those detection sensors are made of an electric conductor. The material of the detection sensors are not particularly restricted, but can be made of an electric conductor such as copper or an alloy thereof. In particular, the detection sensors are made of the same electrically conductive material as that of the wiring pattern of the INV substrate, thereby making it possible to realize the omission of the pattern wiring costs and the formation process, and to obtain the effective detection sensitivity.

Figure 5:
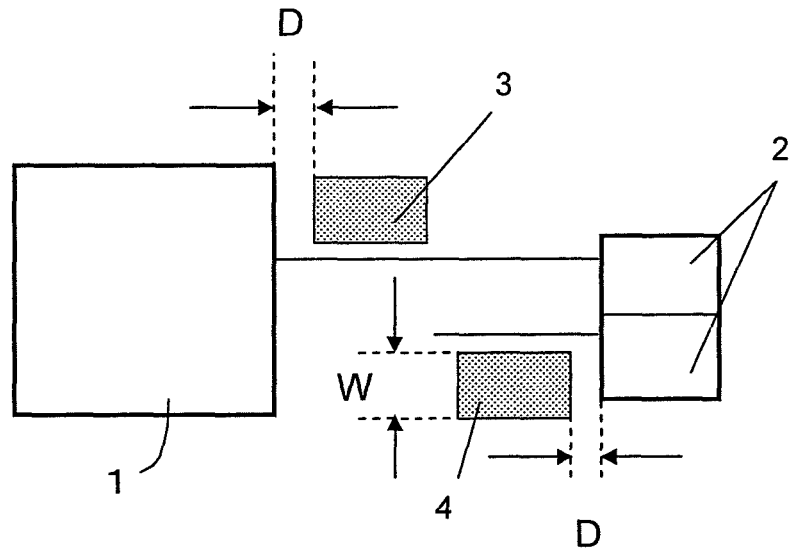
FIG. 5 is an external view showing a layout position of high voltage side and low voltage side detection sensors.

FIG. 5 shows a layout diagram for explaining the layout position and sizes of the high voltage side and low voltage side detection sensors. The high voltage side detection sensor 3 is disposed in the vicinity of the output of the transformer 1, and the low voltage side detection sensor 4 is disposed in the vicinity of the connection point 2. The detection sensitivities of those detection sensors can be enhanced more as the layout position is closer to the transformer 1 or the connection point 2. In this example, the width of the transformer 1 is 20 mm, the width of the connection point 2 is 5 mm, the sizes of the sensors are 5 mm in width and 8 mm in length, and the sensors are arranged apart from high voltage side and low voltage side connection wirings by an interval (distance) of 1 mm. In the above layout relationship, the abnormal discharge is generated, and the abnormal voltage is measured. Table 1 shows a distance D between the secondary side of the transformer 1 and the high voltage side detection sensor 3, whether or not the abnormality can be detected at the high voltage side, and the detected voltage. Likewise, Table 2 shows a distance D between the connection point 2 and the low voltage side detection sensor 4, whether or not the abnormality can be detected at the low voltage side, and the detected voltage.

TABLE 1

| | Postion of sensor (D) | | | | | | |
|---|---|---|---|---|---|---|---|
| | 0.5 mm | 1 mm | 4 mm | 7 mm | 10 mm | 13 mm | 16 mm |
| High voltage side detection results (Detected voltage) | x Burnout | ○ 6 V | ○ 6 V | ○ 5.3 V | ○ 4.8 V | Δ 4.3 V | x 4 V |

TABLE 2

| | Postion of sensor (D) | | | | | | |
|---|---|---|---|---|---|---|---|
| | 0.5 mm | 1 mm | 4 mm | 7 mm | 10 mm | 13 mm | 16 mm |
| Low voltage side detection results (Detected voltage) | x Burnout | ○ 5 V | ○ 4.7 V | ○ 4.5 V | Δ 4.2 V | x 4 V | x 4 V |

As shown in Tables 1 and 2, the voltage that is higher than the normal voltage is detected by the high voltage side detection sensor or the low voltage side detection sensor when the abnormal discharge occurs. For example, the sensors output a detected voltage of about 4 V in the normal state, but the sensor at the high voltage side or the low voltage side outputs the detected voltage of 4 V or higher in the abnormal state. A mark ○ on the abnormality detection result column of Tables 1 and 2 is indicative of stably detectable (detected voltage is equal to or higher than 4.5 V), a mark Δ is indicative of somehow detectable (detected voltage is 4 to 4.5 V), and a mark x is indicative of undetectable (detected voltage is equal to or lower than 4 V). The burnout indicates that the position of the sensors is too close to the transformer or the connection point, and the abnormal discharge gets into the sensors to burn out the sensors.

In the high voltage side detection sensor shown in Table 1, when the sensors and the transformer 1 are made closer to each other with an interval of 0.5 mm, the detected voltage (sense voltage) becomes too large. On the contrary, when the sensors and the transformer 1 are apart from each other by 16 mm, the detected voltage becomes 4 V, and the abnormality determination becomes difficult. It is found that the closest distance between the high voltage side detection sensor and the secondary side of the transformer 1 is 1 to 13 mm, more preferably 1 to 10 mm. In the case of the low voltage side detection sensor of Table 2, when the sensors are made closer to the connection point by 0.5 mm, the detected voltage becomes too large. On the contrary, when the sensors are made apart from the connection point by 13 mm or more, the detected voltage becomes 4 V, and the abnormality determination becomes difficult. It is found that the closest distance between the low voltage side detection sensor and the connection point is 1 to 10 mm, more preferably 1 to 7 mm.

The high voltage side detection sensor and the transformer output are not electrically connected to each other, but the high voltage side detection sensor and the transformer output are arranged at the above optimum distance. With the above arrangement, the abnormal voltage can be detected without the overvoltage being applied directly to the voltage abnormality detector circuit when the abnormal discharge occurs. Accordingly, the high voltage side detection sensor is not damaged. The low voltage side detection sensor and the connection point output are not electrically connected directly to each other, but the low voltage side detection sensor and the connection point output are arranged at the above optimum distance. With the above arrangement, the abnormal voltage can be detected without the overvoltage being applied directly to the voltage abnormality detector circuit when the abnormal discharge occurs. Accordingly, the low voltage side detection sensor is not damaged. In the present invention, the direct connection by the electrically conductive wiring represents the electric connection. As described above, when, for example, the high voltage side detection sensor and the transformer output are arranged at a distance, it is expressed that the high voltage side detection sensor and the transformer output are not electrically connected to each other.

Further, in order to enhance the detection sensitivity of the sensors, the sizes of the respective detection sensors are measured. The width (W) of the high voltage side detection sensor 3, whether or not the abnormality can be detected at the high voltage side, and the detected voltage are shown in Table 3. Similarly, the width (W) of the low voltage side detection sensor 4, whether or not the abnormality can be detected at the low voltage side, and the detected voltage are shown in Table 4. In this case, the distance between the sensors and the transformer or the connection point is set to 4 mm, and other dimensions are the same as those for Tables 1 and 2 unless specifically noted otherwise.

TABLE 3

| | Width of sensor (W) | | | | |
| --- | --- | --- | --- | --- | --- |
| | 1 mm | 3 mm | 5 mm | 8 mm | 10 mm |
| High voltage side detection results (Detected voltage) | x 4 V | ○ 5 V | ○ 6 V | ○ 6 V | ○ 6 V |

TABLE 4

| | Width of sensor (W) | | | | |
| --- | --- | --- | --- | --- | --- |
| | 1 mm | 3 mm | 5 mm | 8 mm | 10 mm |
| Low voltage side detection results (Detected voltage) | x 4 V | Δ 4.2 V | ○ 4.7 V | ○ 5 V | ○ 5 V |

In the case of the high voltage side detection sensor shown in Table 3, when the width of the sensors is 1 mm, the detected voltage is 4 V, and the abnormality cannot be detected. However, when the width of the sensors is set to 3 mm or more, the abnormality can be detected. The abnormal voltage indicated when the width of the sensors is 5 mm or more is a constant value. Therefore, it is preferable that the width of the high voltage side detection sensors is equal to or larger than 3 mm.

In the case of the low voltage side detection sensor shown in Table 4, when the width of the sensors is 1 mm, the detected voltage is 4 V, and the abnormality cannot be detected. Similarly, when the width of the sensors is 3 mm, the detected voltage is 4.2 V, and the abnormality can be somehow detected, but the stable abnormality detection is not conducted. When the width of the sensors is equal to or larger than 5 mm, the abnormality can be stably detected. The abnormal voltage indicated when the width of the sensors is equal to or larger than 8 mm is a constant value. Therefore, it is preferable that the width of the low voltage side detection sensors is equal to or larger than 5 mm.

The measurement is conducted when the width of the sensors is equal to or smaller than 10 mm. However, it may be more preferable that the width of the high voltage side detection sensor is substantially equal to or larger than the width of the transformer, and the width of the low voltage side detection sensor is substantially equal to or larger than the width of the connection point. In this situation, the upper limits of the widths of the high voltage side and low voltage side detection sensors are not particularly restricted. However, since the sizes of the substrate become larger as the width of the sensors is larger, it is preferable that the width of the sensors is set to the degree that does not largely affect the substrate sizes. For example, it is preferable that the upper limits of the widths of the high voltage side and low voltage side detection sensors are equal to or smaller than 50 mm, or equal to or smaller than about three times as large as the width of the transformer. As described above, since the sizes of the sensors are small, and the permissible range of the layout position of the sensors is large, an influence of the sensor sizes on the parts that are mounted on the INV substrate is small. For that reason, the sensors can be arranged without affecting the INV substrate sizes. Further, when the sensors are arranged on the rear surface of the INV substrate as described later, the degree of freedom of the sensor layout is more increased.

As a method of connecting the INV substrate and the lamp, there can be applied an electrically connecting method using soldering up to now. The connection point for connecting to the lamp can be formed of a connector. The recent configuration of the lamp and the INV substrate that drives the lamp is increasingly formed of the connector taking the lamp exchangeability and the workability into consideration. In the case of using the connector, there occurs an electric semi-contact state (a state in which the connection is insufficient) such that the connector is coming off because of the vibrations or other factors, and the electric discharge is generated. The above method can be applied to the abnormal voltage caused by that electric discharge.

Also, at least one of the high voltage side detection sensor and the low voltage side detection sensor according to this embodiment can be disposed on an opposite surface (rear surface) of the substrate surface (front surface) on which the transformer and the connection point are mounted. The provision of the detection sensors on the rear surface has the advantage that the detection sensors can be located at a free position without being affected by the circuit layout of the front surface side. As usual, no circuit is disposed on the rear surface of the INV substrate. Therefore, when the detection sensors are located on the rear surface, the layout having some degree of freedom can be realized without taking short-circuit with the wiring into consideration. Also, an improvement in the voltage abnormality detection sensitivity can be realized by interposing the INV substrate between the high voltage side detection sensor and the low voltage side detection sensor, and positioning the transformer and the connection point on the opposite surface, respectively. In this case, parts of the detection sensors overlap with the transformer or the connection point on the opposite surface.

Also, in this embodiment, both of the paired high voltage side detection sensor and high-voltage voltage abnormality detector circuit, and the paired low voltage side detection sensor and low-voltage voltage abnormality detector circuit are disposed. However, there can be disposed only the paired high voltage side detection sensor and high-voltage voltage abnormality detector circuit, or the paired low voltage side detection sensor and low-voltage voltage abnormality detector circuit. However, it is more preferable to dispose those elements on both of the high voltage side and the low voltage side.

The INV substrate according to this embodiment has a detection mechanism that monitors the voltage abnormality when the corona discharge or the arc discharge occurs due to the abnormal connection of the substrate, on both of the high voltage side and the low voltage side with high sensitivity. The detection mechanism includes a detection section (sensor) and an arithmetic circuit section. The detection section includes the high voltage side detection sensor, and the low voltage side detection sensor. The arithmetic circuit section includes the high-voltage voltage abnormality detector circuit, and the low-voltage voltage abnormality detector circuit. In particular, the layout position of the detection section (sensor) is disposed in the vicinity of the transformer output and the lamp connection point without being electrically connected to the transformer output or the lamp connection point. The arrangement of the detection section in the vicinity of those portions enables the voltage abnormality to be detected with high sensitivity without damaging the detection section by overvoltage. Also, the arithmetic circuit section compares the input sense voltage with the threshold voltage, outputs the abnormality detection signal, and stops the output of the transformer, thereby making it possible to prevent the INV substrate to be damaged. According to this embodiment, there can be obtained the DC/AC inverter substrate which is capable of detecting the abnormal discharge with high sensitivity.

Second Exemplary Embodiment

Figure 6:
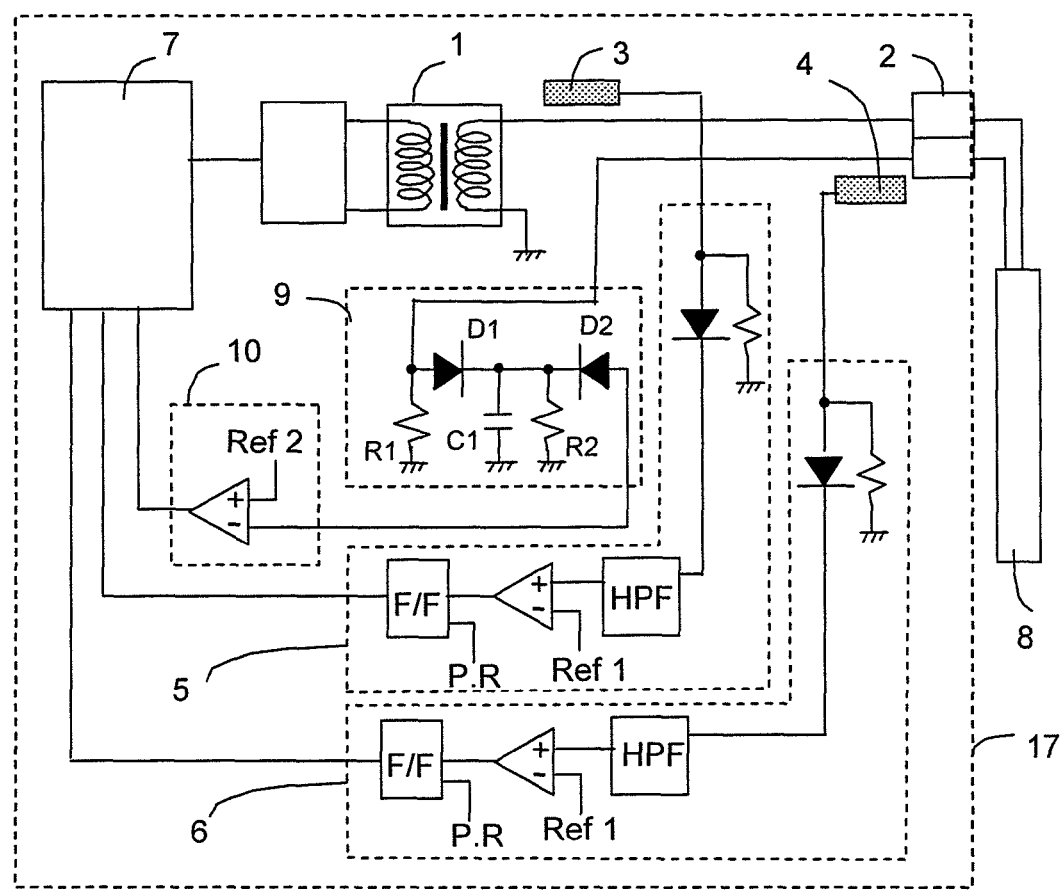
FIG. 6 is a diagram showing a voltage abnormality detector circuit according to a second exemplary embodiment of the present invention.

A second exemplary embodiment of the present invention will be described with reference to FIG. 6. FIG. 6 shows a diagram of a voltage abnormality detector circuit that controls the lighting of a liquid crystal display device backlight according to the second embodiment. The voltage abnormality detector circuit according to the first exemplary embodiment detects the abnormal high voltage of electric discharge. The voltage abnormality detector circuit according to the second exemplary embodiment further includes a current-degradation voltage abnormality detector circuit for detecting the current degradation abnormality. Like circuit parts as those in the first embodiment are denoted by like reference numerals, and their description will be omitted.

A second voltage abnormality detector circuit 17 shown in FIG. 6 includes a current-degradation voltage abnormality detector circuit between the lamp return current side (low voltage side) of the connection point 2 and the control circuit 7 in addition to the circuit of the first embodiment. The current-degradation voltage abnormality detector circuit is made up of a current/voltage converter circuit 9 and a current detector circuit 10. The current/voltage converter circuit 9 is made up of diodes D1, D2, resistors R1, R2, and a capacitor C1. The low voltage side of the connection point 2 is connected to one terminal of the resistor R1 and the anode of the diode D1. Another terminal of the resistor R1 is connected to the ground voltage. The cathode of the diode D1 is connected to one terminal of the capacitor C1, one terminal of the resistor R2, and the cathode of the diode D2. The other terminals of the capacitor C1 and the resistor R2 are connected to the ground voltage, respectively. The anode of the diode D2 is connected to the input of a comparator of the current detector circuit 10. The current/voltage converter circuit 9 converts the lamp return current of the lamp 8 into a voltage, and outputs the voltage to the converted current detector circuit 10.

The current detector circuit 10 compares an output from the current/voltage converter circuit 9 with a threshold voltage Ref2. When the output from the current/voltage converter circuit 9 is smaller than the threshold voltage Ref2, the current detector circuit 10 outputs an abnormality detection signal to the control circuit 7. The control circuit 7 stops the transformer output of the INV substrate according to the abnormality detection signal from the current detector circuit 10. For example, when the lamp is deteriorated, or the lamp breaks down, the output current of the lamp is reduced. The current degradation abnormality that the lamp return current is reduced is detected by the current/voltage converter circuit 9 and the current detector circuit 10 to output the abnormality detection signal. The control circuit 7 stops the transformer output of the INV substrate according to the input abnormality detection signal.

In this embodiment, overvoltage at the time when the abnormal discharge occurs is detected by the high voltage side detection sensor 3, the high-voltage voltage abnormality detector circuit 5, the low voltage side detection sensor 4, and the low-voltage voltage abnormality detector circuit 6. Also, the provision of the current-degradation voltage abnormality detector circuit that is made up of the current/voltage converter circuit 9 and the current detector circuit 10 enables the current degradation abnormality to be detected when the lamp current is small. In this way, there can be obtained the DC/AC inverter substrate having the voltage abnormality detector circuit which is capable of detecting the abnormal discharge and the current degradation abnormality.

Third Exemplary Embodiment

Figure 7:
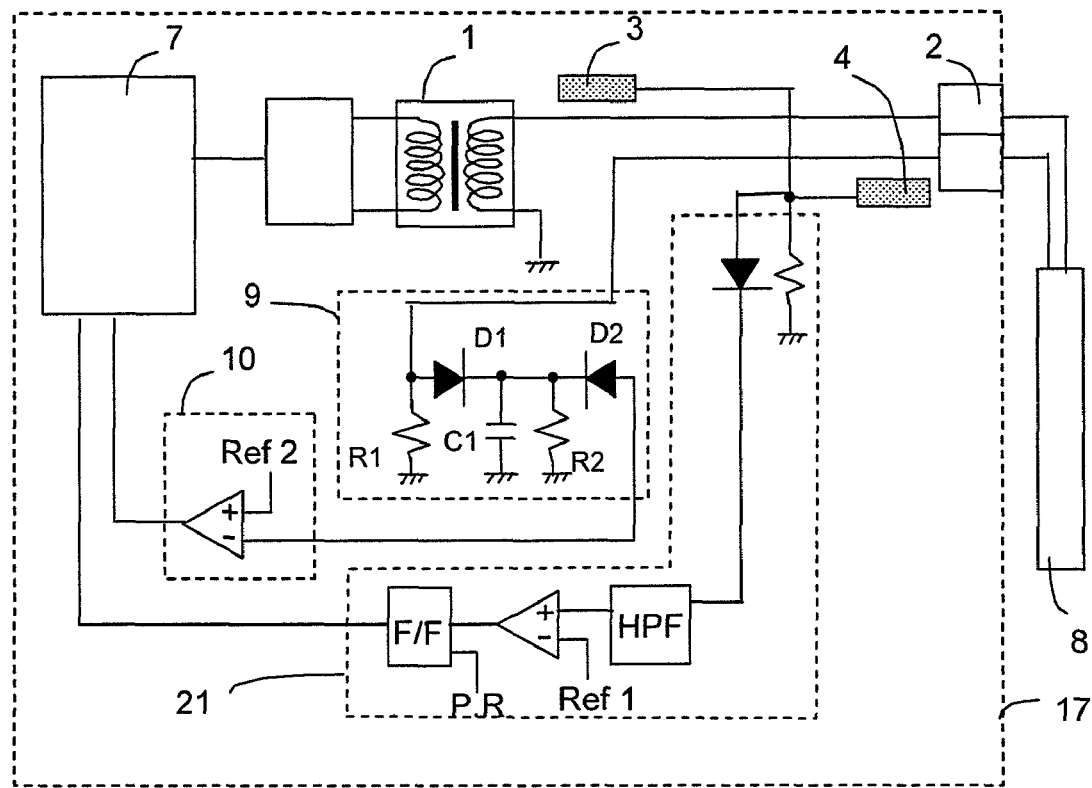
FIG. 7 is a diagram showing a voltage abnormality detector circuit according to a third exemplary embodiment of the present invention.
Figure 8:
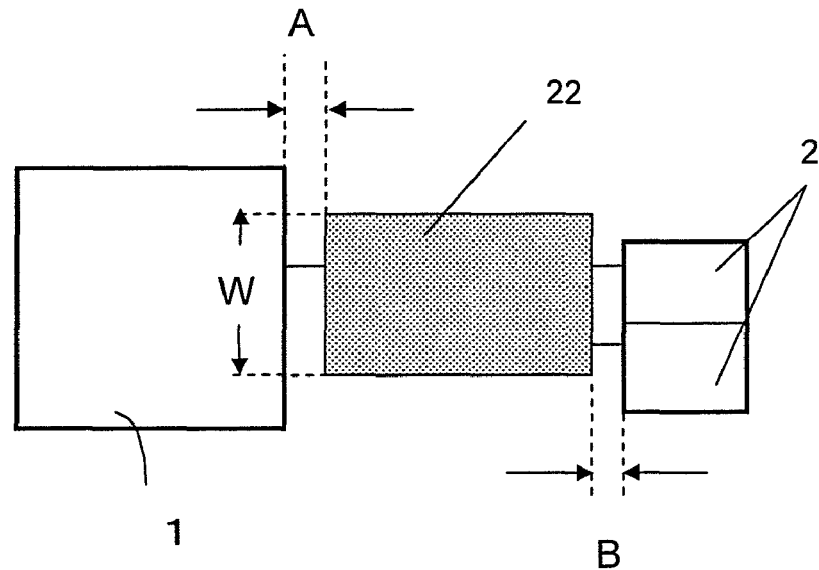
FIG. 8 is an external view showing a layout position of a high-voltage and low-voltage detection sensor.

A third exemplary embodiment of the present invention will be described with reference to FIGS. 7 and 8, and Tables 5 and 6. In this embodiment, the high-voltage voltage abnormality detector circuit and the low-voltage voltage abnormality detector circuit according to the first and second embodiments are shared to provide one high-voltage and low-voltage voltage abnormality detector circuit. Also, the high voltage side detection sensor and the low voltage side detection sensor can be shared to provide one high-voltage and low-voltage detection sensor. FIG. 7 shows a diagram of a high-voltage and low-voltage voltage abnormality detector circuit. FIG. 8 shows an external view of the layout position of the high-voltage and low-voltage detection sensor. Tables 5 and 6 show the measurement results of the voltage abnormality detector circuit, respectively. Also, like circuit parts as those in the first and second embodiments are denoted by like reference numerals, and their description will be omitted.

The voltage abnormality detector circuit 17 shown in FIG. 7 constitutes the high-voltage voltage abnormality detector circuit and the low-voltage voltage abnormality detector circuit as one high-voltage and low-voltage voltage abnormality detector circuit 21. There is provided one voltage abnormality detector circuit, and both the outputs from the high voltage side detection sensor 3 and the low voltage side detection sensor 4 are commonly input to the high-voltage and low-voltage voltage abnormality detector circuit 21.

The high-voltage and low-voltage voltage abnormality detector circuit 21 receives the sense voltages from the high voltage side detection sensor 3 and the low voltage side detection sensor 4 to the anode of the diode and one terminal of the resistor. Another terminal of the resistor is connected to the ground voltage. The sense voltage is input to an HPF through the cathode of the diode. The output of the HPF and a threshold voltage Ref1 are compared by a comparator, and its comparison result is output to a flip-flop circuit. When the high-voltage and low-voltage voltage abnormality detector circuit 21 detects the abnormal voltage, the control circuit 7 stops the output of the transformer 1 according to a signal from the flip-flop circuit. The configuration of the high-voltage and low-voltage voltage abnormality detector circuit 21 is identical with that of the high-voltage voltage abnormality detector circuit 5 and the low-voltage voltage abnormality detector circuit 6 except that the input sense voltage is different.

In the normal operation, the input voltage of the comparator is about 4 V. However, when abnormal discharge such as arc discharge or corona discharge occurs from the transformer 1, the lamp 8, or a lamp cable, the input voltage to the comparator increases up to 5-8V. For example, the input voltage of the comparator is 5 V. In this situation, when a reference voltage (threshold voltage) of the comparator is set to 4 V or higher, for example, 4.5 V, the comparator determines the input voltage as abnormality, and outputs the abnormality detection signal to the control circuit 7. The control circuit 7 is capable of stopping the transformer output of the INV substrate according to the abnormality detection signal from the comparator.

Also, the two detection sensors (high voltage side detection sensor 3 and low voltage side detection sensor 4) can be shared to provide one high-voltage and low-voltage detection sensor 22. FIG. 8 shows an external view of the layout position of the high-voltage and low-voltage detection sensor 22. The high-voltage and low-voltage detection sensor 22 is disposed in the vicinity of the output wiring (high voltage side) from the transformer 1 and the lamp return current wiring (low voltage side) from the lamp. In FIG. 8, the detection sensor that overlaps with the high voltage side wiring and the low voltage side wiring is disposed. However, the arrangement is not particularly restricted, and it is possible that the circuit element is mounted on the front surface of the INV substrate, and the detection sensor can be provided on the opposite rear surface.

The layout position of the high-voltage and low-voltage detection sensor 22 is shown in FIG. 8. The detection results and the measurement results of the detected voltage are shown in Tables 5 and 6. The width of the transformer 1 is 20 mm, and the width of the connection point 2 is 5 mm. Table 5 represents the detection results and the measurement results of the detected voltage at a distance (A) from the transformer 1 and at a distance (B) from the connection point 2 when the sizes of the high-voltage and low-voltage detection sensor 22 are 5 mm in width and 10 mm in length. Also, in Table 6, the distance (A) of the high-voltage and low-voltage detection sensor 22 from the transformer 1 and the distance (B) from the connection point 2 are equal to each other and 4 mm, and the length of the high-voltage and low-voltage detection sensor 22 is 10 mm. Table 6 represents the width (W) of the high-voltage and low-voltage detection sensor 22, the detection results, and the measurement results of the detected voltage.

TABLE 5

| | Position of sensor (A, B) | | | | | | |
|---|---|---|---|---|---|---|---|
| | 0.5 mm | 1 mm | 4 mm | 7 mm | 10 mm | 13 mm | 16 mm |
| High voltage side detection results (Detected voltage) | x Burnout | ○ 6 V | ○ 6 V | ○ 5.3 V | ○ 4.8 V | Δ 4.3 V | x 4 V |
| Low voltage side detection results (Detected voltage) | x Burnout | ○ 5 V | ○ 4.7 V | ○ 4.5 V | Δ 4.2 V | x 4 V | x 4 V |

TABLE 6

| | Width of sensor (W) | | | | |
|---|---|---|---|---|---|
| | 1 mm | 3 mm | 5 mm | 8 mm | 10 mm |
| High voltage side detection results (Detected voltage) | x 4 V | ○ 5 V | ○ 6 V | ○ 6 V | ○ 6 V |
| Low voltage side detection results (Detected voltage) | x 4 V | Δ 4.2 V | ○ 4.7 V | ○ 5 V | ○ 5 V |

According to the measurement results of Table 5, the distance (A) between the high-voltage and low-voltage detection sensor 22 and the secondary side of the transformer is preferably 1 to 13 mm, and more preferably 1 to 10 mm. The closest distance (B) between the high-voltage and low-voltage detection sensor 22 and the connection point is preferably 1 to 10 mm, and more preferably 1 to 7 mm. Also, according to the measurement results of Table 6, the width of the high-voltage and low-voltage detection sensor 22 is preferably 3 mm or larger, and more preferably 5 mm or larger. The upper limit of the width is not particularly restricted. However, since the sizes of the substrate become larger as the width of the sensors is larger, it is preferable that the width of the sensors is set to the degree that does not largely affect the substrate sizes. For example, it is preferable that the upper limits of the widths of the high-voltage and low-voltage detection sensor is equal to or smaller than 50 mm, or equal to or smaller than about three times as large as the width of the transformer.

In this embodiment, the high-voltage and low-voltage voltage abnormality detector circuits are shared to provide one high-voltage and low-voltage voltage abnormality detector circuit. Also, the high voltage side and low voltage side detection sensors are shared to provide one high-voltage and low-voltage detection sensor. In this way, those detector circuits and those sensors are shared by one detector circuit and one sensor, thereby enabling a reduction in the number of circuits. The sharing of the detector circuits prevents a risk of the disconnection of the wiring or the failure of the circuits, and is superior in the downsizing of the INV substrate due to the reduction in space and the yield of the manufacturing. There can be obtained the DC/AC inverter substrate which is capable of detecting the abnormal discharge and the abnormality that the lamp current is small, and is downsized and low in cost.

The present invention pertains to the DC/AC inverter substrate for controlling the lighting of the liquid crystal backlight, and particularly provides the DC/AC inverter substrate having a voltage abnormality detector circuit which is capable of detecting the voltage abnormality. The voltage abnormality detector circuit according to the present invention is capable of monitoring with high sensitivity the high voltage abnormality such as the corona discharge or the arc discharge which occurs when the substrate connection point is in the semi-contact state.

The voltage abnormality is detected by the detection sensor and the voltage abnormality detector circuit. In particular, the layout position of the detection sensors is arranged in the vicinity of the secondary side of the transformer and the lamp connection point without any electric connection therewith, thereby enabling the voltage abnormality to be detected with high sensitivity. Also, the output of the transformer stops by means of the control circuit that receives the abnormality detection signal from the voltage abnormality detector circuit, thereby making it possible to prevent the INV substrate from being damaged.

As the detection sensor, the high voltage side detection sensor or the low voltage side detection sensor, or both of those detection sensors can be provided. The high voltage side detection sensor is disposed in the vicinity of the transformer without being electrically connected to the secondary side of the transformer. The low voltage side detection sensor is disposed in the vicinity of the terminal of the lamp return current side in the connection point without being electrically connected to the connection point. In this way, the layout position of the high voltage side detection sensor is disposed in the vicinity of the transformer as compared with the layout position of the low voltage side detection sensor. The layout position of the low voltage side detection sensor is disposed in the vicinity of the connection point as compared with the layout position of the high voltage side detection sensor.

The closest distance between the high voltage side detection sensor and the secondary side of the transformer is set to 1 to 13 mm, or more preferably 1 to 10 mm. The width of the high voltage side detection sensor can be set to 3 mm or larger, or made equal to or larger than the width of the transformer. The closest distance between the low voltage side detection sensor and the connection point is set to 1 to 10 mm, more preferably 1 to 7 mm. The width of the low voltage side detection sensor can be set to be equal to or larger than 3 mm, more preferably equal to or larger than 5 mm. Also, the width of the low voltage side detection sensor can be set to be equal to or larger than the width of the connection point.

Also, in the DC/AC inverter substrate according to the present invention, when the high voltage side detection sensor and the low voltage side detection sensor are connected to each other, because the high voltage side and low voltage side voltage abnormality detector circuits can be shared, the inverter substrate can be downsized. Further, in the DC/AC inverter substrate according to the present invention, the high voltage side detection sensor and the low voltage side detection sensor can be shared to provide the high-voltage and low-voltage detection sensor. It is preferable that the closest distance between the high-voltage and low-voltage detection sensor and the secondary side of the transformer is 1 to 13 mm, and the closest distance between the high-voltage and low-voltage detection sensor and the connection point is 1 to 10 mm. It is more preferable that the closest distance between the high-voltage and low-voltage detection sensor and the secondary side of the transformer is 1 to 10 mm, and the closest distance between the high-voltage and low-voltage detection sensor and the connection point is 1 to 7 mm. The width of the high-voltage and low-voltage detection sensor can be set to be equal to or larger than 3 mm, or more preferably equal to or larger than 5 mm.

The high voltage side detection sensor, the low voltage side detection sensor, and the high-voltage and low-voltage detection sensor can be disposed on an opposite surface of the substrate surface on which the transformer and the connection point are mounted. At least a part of the high voltage side detection sensor on the opposite surface of the substrate overlaps with the transformer on the surface of the substrate. At least a part of the low voltage side detection sensor on the opposite surface of the substrate overlaps with the connection point on the surface of the substrate. At least a part of the high-voltage and low-voltage detection sensor on the opposite surface of the substrate overlaps with the transformer and the connection point on the surface of the substrate. The high voltage side detection sensor, the low voltage side detection sensor, and the high-voltage and low-voltage detection sensor can be made of the same electrically conductive material as that of the connection wiring on the substrate, and the electrically conductive material can be copper or an alloy thereof.

Further, the DC/AC inverter substrate according to the present invention provides the current/voltage converter circuit and the detector circuit to the output of the substrate connection point, thereby making it possible to detect the current degradation abnormality that the output current from the lamp is small. The current value that has been output from the connection point is converted into the voltage value by the current/voltage converter circuit, and the converted voltage value is calculated by the comparator of the detector circuit, thereby making it possible to detect the current degradation abnormality with high sensitivity. There can be obtained the DC/AC inverter substrate which is capable of detecting the abnormal discharge and the abnormality that the lamp current is small, and is downsized and low in cost.

According to the present invention, there can be obtained the DC/AC inverter substrate having the voltage abnormality detector circuit which is capable of detecting the voltage abnormality. Also, the lamp is connected to the connection point of the DC/AC inverter substrate having the voltage abnormality detector circuit to obtain the light source unit. As the lamp, a cold cathode fluorescent lamp (CCFL) or a light emitting diode (LED) can be used. Further, the liquid crystal display device can be obtained by the light source unit, a liquid crystal panel, and an electric circuit that drives the liquid crystal panel.

Figure 9:
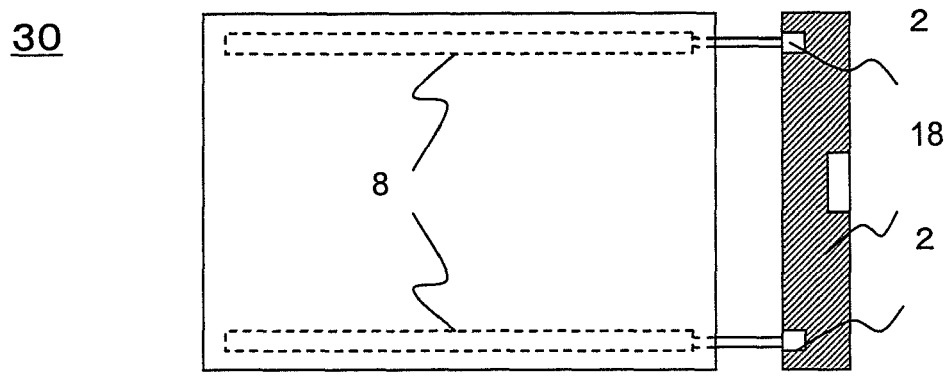
FIG. 9 is an external view showing a light source unit.
Figure 10A:
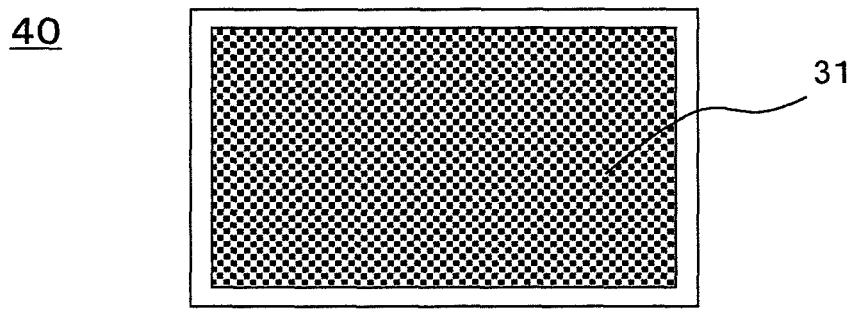
FIG. 10A is a top plan view showing a liquid crystal display device.
Figure 10B:
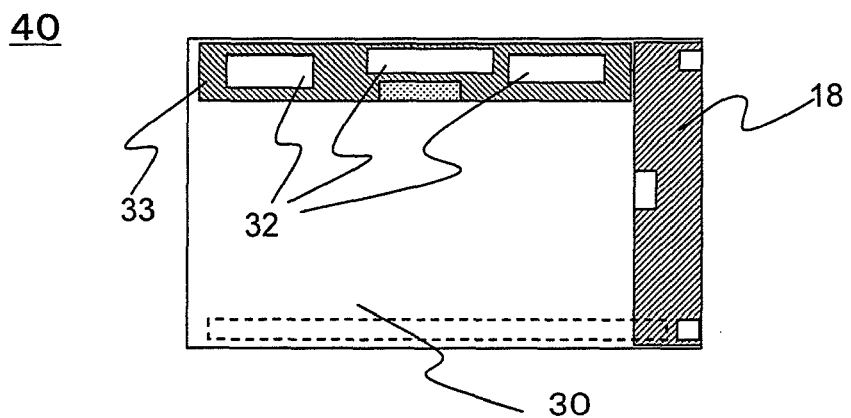
FIG. 10B is a bottom plan view showing a liquid crystal display device that removed a cover.

For example, the light source unit and the liquid crystal display device can be composed as shown in FIGS. 9, 10A and 10B. The light source unit 30 as shown in FIG. 9 includes the DC/AC inverter substrate 18 that has the voltage abnormality detector circuit, and the lamp 8 that is connected to the connection point 2 of the DC/AC inverter substrate 18. FIGS. 10A and 10B show the liquid crystal display device. FIG. 10A is a top plan view of the liquid crystal display device, and FIG. 10B is a bottom plan view of the liquid crystal display device that removed a cover. The liquid crystal panel 31 is disposed on the top surface side of the liquid crystal display device 40, and the light source unit 30 and an electric circuit substrate 33 that mounted an electric circuit 33 that drives the liquid crystal panel are disposed on the bottom surface side of the liquid crystal display device 40. According to the present invention, there can be obtained the light source unit 30 and the liquid crystal display device 40 that can be stably operated by detecting the voltage abnormality.

The above description has been given of the embodiments in detail. However, the present invention is not limited to those embodiments, and various modifications can be conducted without deviating from the summary of the invention. The modified examples are also included in the present application.

What is claimed is:

1. A DC/AC inverter substrate having a voltage abnormality detector circuit, the voltage abnormality detector circuit comprising:
    a transformer;
    a connection point for connecting to a lamp;
    a high voltage side detection sensor that is disposed at a secondary side of the transformer without being electrically connected to the secondary side;
    a high-voltage voltage abnormality detector circuit that receives a sense voltage from the high voltage side detection sensor and outputs an abnormality detection signal when the sense voltage is equal to or higher than a set value; and
    a control circuit that receives the abnormality detection signal from the high-voltage voltage abnormality detector circuit and stops transformer output,
    wherein the high voltage side detection sensor is disposed on an opposite surface of a substrate surface on which the transformer and the connection point are mounted.

2. A DC/AC inverter substrate having a voltage abnormality detector circuit according to claim 1, wherein the high voltage side detection sensor is disposed in a vicinity of the transformer without being electrically connected to the secondary side of the transformer.

3. A DC/AC inverter substrate having a voltage abnormality detector circuit according to claim 1, wherein the closest distance between the high voltage side detection sensor and the secondary side of the transformer is 1 to 13 mm.

4. A DC/AC inverter substrate having a voltage abnormality detector circuit according to claim 1, wherein a width of the high voltage side detection sensor is equal to or larger than 3 mm.

5. A light source unit comprising the DC/AC inverter substrate having a voltage abnormality detector circuit according to claim 1, wherein the lamp is connected to the connection points.

6. A liquid crystal display device, comprising:
    a liquid crystal panel;
    an electric circuit that drives the liquid crystal panel; and
    the light source unit according to claim 5.

* * * * *